United States Patent [19]
Sumida et al.

[11] Patent Number: 5,523,073
[45] Date of Patent: Jun. 4, 1996

[54] MANGANESE DIOXIDE FOR LITHIUM PRIMARY BATTERY AND METHOD OF PRODUCING THE SAME

[75] Inventors: Hiroshi Sumida; Yoshio Nakatani; Takuya Deguchi, all of Hiroshima, Japan

[73] Assignee: Mitsui Mining & Smelting Co., Ltd., Tokyo, Japan

[21] Appl. No.: 413,425

[22] Filed: Mar. 30, 1995

[30] Foreign Application Priority Data

Mar. 31, 1994 [JP] Japan .................................. 6-063503

[51] Int. Cl.⁶ .......................... H01M 4/50; C01G 45/02
[52] U.S. Cl. .............................. 423/605; 429/224
[58] Field of Search ...................... 429/224; 423/605, 423/599; 264/104, 105, 29.1; 252/182.1

[56] References Cited

U.S. PATENT DOCUMENTS

| | | | |
|---|---|---|---|
| 4,133,856 | 1/1979 | Ikeda et al. | 429/224 X |
| 4,297,231 | 10/1981 | Kahara et al. | 423/599 X |
| 4,604,336 | 8/1986 | Nardi | 423/605 X |
| 4,921,689 | 5/1990 | Walker et al. | 423/605 |
| 5,156,933 | 10/1992 | Yamaguchi et al. | 429/224 |

FOREIGN PATENT DOCUMENTS

| | | |
|---|---|---|
| 54-113030 | 9/1979 | Japan . |
| 54-118534 | 11/1979 | Japan . |
| 57-182973 | 11/1982 | Japan . |
| 2-57693 | 2/1990 | Japan . |
| 2-155166 | 6/1990 | Japan . |
| 7-5319 | 1/1995 | Japan . |

OTHER PUBLICATIONS

EP-A-0-348 083 including search report Dec. 1989.

*Primary Examiner*—Anthony Skapars
*Attorney, Agent, or Firm*—Kane, Dalsimer, Sullivan, Kurucz, Levy, Eisele and Richard

[57] ABSTRACT

In a method of producing manganese dioxide for a lithium primary battery, heat treatment for dehydrating water-containing manganese dioxide is carried out by continuously calcining the water-containing manganese dioxide at 440° C. to 480° C., preferably by controlling the flow rate of air introduced into the furnace to the value of from 20 to 2000 Nl per 1 kg water-containing manganese dioxide which is supplied into the furnace. According to this method, the residual bound water in the calcined manganese dioxide is reduced as compared those treated with a conventional method, and thus preservation property of a battery can be improved.

5 Claims, 3 Drawing Sheets

MANGANESE DIOXIDE FOR LITHIUM PRIMARY BATTERY AND METHOD OF PRODUCING THE SAME

BACKGROUND OF THE INVENTION

1. Field of the Invention

This invention relates to manganese dioxide which is used for anode active material of a lithium primary battery, and a method of producing the same.

2. Description of Related Art

Manganese dioxide, carbon fluoride, etc. have been known as representative anode active material of a lithium primary battery, and these materials have been already practically used. Of these anode active materials, manganese dioxide has particularly excellent discharge characteristics and is low in price.

In order to mainly improve preservation of the lithium primary battery, the manganese dioxide used for the anode active material of the lithium primary battery has been hitherto produced by a method as disclosed in JPB Sho 57-4064. That is, the manganese dioxide is calcined at 350° C. to 430° C. to remove water in the manganese dioxide, and then it is used as anode active material. At present, the lithium primary battery using manganese dioxide as anode active material has been utilized in a camera or the like, and recent improvement in performance and function (higher performance and higher functionality) of the camera increasingly requires a lithium primary battery having more improved discharge characteristic and preservation characteristic.

In view of such a condition, it has been recently recognized that manganese dioxide after calcined (hereinafter referred to as "calcined manganese dioxide") is required to have a large specific surface area to improve not only the discharge capacity of the lithium primary battery, but also the discharge voltage thereof.

Furthermore, it has been hitherto considered that in order to keep the specific surface area of calcined manganese dioxide high, it is necessary to perform a calcination treatment in a low calcination temperature range of 350° to 430° C. as described in the above prior art, particularly in a range of 350° to 400° C. However, the low temperature calcination treatment increases the amount of residual bound water in calcined manganese dioxide although the specific surface area of the manganese dioxide is kept high. When such manganese dioxide having a large amount of residual bound water is used as anode active material for a lithium primary battery, the residual water reacts with lithium or lithium alloy at a cathode and decomposition of dehydrated electrolytic solution is promoted. Therefore, the preservation performance of the lithium primary battery, particularly the performance of the lithium primary battery after preserved at a high temperature is remarkably deteriorated.

On the other hand, if the calcination temperature is increased to 440° C. or more to improve the preservation characteristic, the amount of the bound water is reduced, however, manganese dioxide is decomposed and changed to $Mn_2O_3$, so that the discharge performance of the battery is remarkably deteriorated.

As described above, there has not yet been developed a method of manufacturing calcined manganese dioxide for a lithium primary battery in which the high specific surface area and the low bound water amount can be kept at high level with excellent balance.

An object of the present invention is to provide manganese dioxide for a lithium primary battery and a method of producing the same in which both suppression in reduction of specific surface area and removal of bound water can be performed at the same time.

SUMMARY OF THE INVENTION

According to the present invention, there is provided a method of producing manganese dioxide for a lithium primary battery including a heat treatment of water-containing manganese dioxide for dehydration, characterized in that said heat treatment comprises continuously calcining water-containing manganese dioxide in a continuous rotary furnace with external heating at a calcination temperature ranging from 440° C. to 480° C.

In order to attain the above object, a calcination treatment of water-containing manganese dioxide containing water is conducted using a continuous rotary furnace with external heating in a high temperature range of 440° C. to 480° C., preferably of 450° C. to 470° C., which has been impossible in the prior art, while the amount of air flowing from the outside of the furnace into the furnace is adjusted to a fixed range. The air flow amount supplied into the continuous rotary furnace with external heating is controlled to be in the range of 20 to 2000 Nl per 1 kg water-containing manganese dioxide, preferably in the range of 100 to 1000 Nl.

In the following description, the term "water-containing manganese dioxide" means manganese dioxide before being subjected to heat treatment, and it may be any one of electrolytic (electrolytically produced) manganese dioxide, chemical (chemically produced) manganese dioxide and natural manganese dioxide. Of these materials, electrolytic manganese dioxide is more preferable in consideration of purity and characteristics, and particularly electrolytic manganese dioxide which is adjusted to contain phosphorus of 0.05 to 2.0 wt % to have a larger specific surface area as compared with the prior art, as disclosed in JPA Hei 2-57693, JPA Hei 2-155166 and U.S. Pat. No. 5,156,933, is most preferably used. Any structure or size may be adopted for the "continuous rotary furnace with external heating" insofar as it is a continuous rotary furnace which is designed to be heated from the external.

A continuous calcination system using a continuous rotary furnace with external heating is most preferable to effectively control the physical property of calcined manganese dioxide under a calcination condition. In the case where the continuous rotary furnace with external heating is used, the used water-containing manganese dioxide is moved while stirred in the furnace at all times, so that air which is introduced from the external of the furnace at a controlled flow amount is effectively contacted with manganese dioxide in the furnace. As a result, calcined manganese dioxide for lithium primary battery having more preferable characteristics can be obtained.

Manganese dioxide having the same characteristics can be produced by Heleschoff furnace or a flow type calcination furnace, for example. However, the Heleschoff furnace has a disadvantage that manganese dioxide is insufficiently stirred and a piston flow in the furnace is not expectable, so that it cannot produce excellent manganese dioxide in an industrial scale. Likewise, the flow type calcination furnace has the same disadvantage that it is not suitable for the industrial scale production (mass production). That is, this furnace is ideal in the stirring and mixing with air, but it has a problem that the air flow cannot be freely set to any value because the flow amount of the introduced air must be determined on the basis of the flow condition.

Use of a belt type continuous calcination furnace may be considered. The perfect piston flow in the furnace is expectable to this furnace, however, a manganese dioxide layer on the belt must be designed to be extremely thin in order to sufficiently mix manganese dioxide and air with each other, so that facilities are excessively large and the cost is extremely high, and this is not realistic.

Furthermore, a batch type standing calcination furnace has not only the same problem as the belt type continuous calcination furnace, but also the following problem which is inherent to the batch type. That is, the temperature of manganese dioxide varies with time lapse, and thus the calcination under a fixed atmosphere, that is, under a fixed moisture partial pressure as described layer cannot be performed. Therefore, it is difficult to sufficiently control the characteristics of calcined manganese dioxide.

Accordingly, the continuous rotary furnace with external heating is indispensable to attain the above object of the present invention.

DETAILED DESCRIPTION OF THE INVENTION

In the present invention, water-containing manganese dioxide is continuously calcined in a calcination temperature range of 440° C. to 480° C., more preferably of 450° C. to 470° C. using a continuous rotary furnace with external heating in which air flow amount in the furnace (hereinafter referred to as "air ratio") is set to 20 to 2000 Nl per manganese dioxide of 1 kg (hereinafter referred to as "20 to 2000 Nl/kg"), whereby a decomposition reaction of the water-containing manganese dioxide can be suppressed and reduction in the specific surface area can be suppressed at the same time. The reason for this effect is not clearly understood, however, it is guessed as follows.

It is unclear how the bound water contained in the water-containing manganese dioxide and oxygen are constructed in the water-containing manganese dioxide, however, the calcination of the water-containing manganese dioxide eliminates the bound water and the oxygen from the water-containing manganese dioxide at the same time although the elimination rate varies in accordance with the temperature. That is, it can be concluded that the elimination reaction of the bound water and the oxygen when the water-containing manganese dioxide is calcined is a competing reaction between the bound water and the oxygen. The elimination reaction rate of the bound water and the oxygen from the water-containing manganese dioxide is estimated to be associated with a calcination atmosphere, that is, a moisture partial pressure and an oxygen partial pressure on the surface of each particle of the water-containing manganese dioxide. This means that the elimination of the bound water is accelerated as the moisture partial pressure is reduced, and likewise, the elimination of the oxygen is accelerated as the oxygen partial pressure is reduced.

The detailed mechanism on reduction of the specific surface area of the water-containing manganese dioxide due to the calcination is unclear. However, it is known that when the water-containing manganese dioxide is heated and calcined, the bound water is eliminated, and at the same time the crystal structure of the manganese dioxide varies to a so called β-type. As the structural variation to the β-type due to the calcination proceeds increasingly, the crystal structure is increasingly shifted to a structure having a small specific surface area which is thermally stable. The elimination reaction of the bound water of the water-containing manganese dioxide and the variation of the crystal structure have close relation to each other. If the elimination reaction of the bound water during heating is slow, the applied thermal energy when the structure varies to the β-type acts on the crystal structure itself more strongly, so that the variation of the crystal structure is accelerated, and the specific surface area is also reduced in accordance with the acceleration of the crystal structure variation.

On the basis of the above guess, the action of the present invention can be explained as follows.

When the water-containing manganese dioxide is continuously calcined in the continuous rotary furnace with external heating, the water-containing manganese dioxide is rapidly heated and the bound water thereof is eliminated. At this time, when air is introduced from the outside of the furnace in the opposite direction to the flow of the water-containing manganese dioxide while controlling the air flow amount, the bound water which is eliminated from the water-containing manganese dioxide and vaporized is rapidly discharged to the outside of the furnace together with air. As a result, the moisture partial pressure on the particle surface of the heated water-containing manganese dioxide is kept to be low at all times, so that the elimination of the bound water can be rapidly performed. The rapid elimination of the bound water can suppress the reduction of the specific surface area due to the heat calcination to the minimum. As is apparent from the specific examples described later, the adjustment of the moisture partial pressure on the particle surface of the water-containing manganese dioxide during the elimination of the bound water can be performed by changing the air amount to be introduced into the furnace, and thus the specific surface area of calcined manganese dioxide can be adjusted if occasion demands. As described above, the air is introduced into the furnace from the outside of the furnace and the moisture partial pressure on the particle surface of the water-containing manganese dioxide is reduced and kept to a fixed value, so that the reduction of the oxygen partial pressure can be relatively prevented. Therefore, decomposition of manganese dioxide due to elimination of oxygen can be prevented even in the high temperature range of 440° C. to 480° C., more preferably 450° C. to 470° C., which has been impossible in the prior art.

As described in the specific examples described later, the oxygen concentration under an atmosphere which is required in the present invention may be set to the same level as the atmospheric air, that is, about 21%, and no large effect is observed if the oxygen concentration is increased to a value higher than 21%.

With respect to the elimination of the bound water of the water-containing manganese dioxide, no dehydration reaction is observed at a specific temperature unlike crystal water of a normal compound, and a suitable amount of bound water is gradually eliminated as the calcination temperature is increased. Accordingly, the residual bound water of the calcined manganese dioxide is reduced as the calcination temperature is increased. In this point, the calcination at the high temperature range which has been impossible in the prior art can be performed. Accordingly, the residual bound water of calcined manganese dioxide which is produced in the method of the present invention can be more reduced as compared with that of calcined manganese dioxide which is produced in the conventional method, so that the preservation of the battery can be more improved.

DETAILED DESCRIPTION OF THE INVENTION

The method of the present invention will be described hereunder with reference to the accompanying drawings.

[Construction of Continuous Calcination Furnace]

Figure 1:
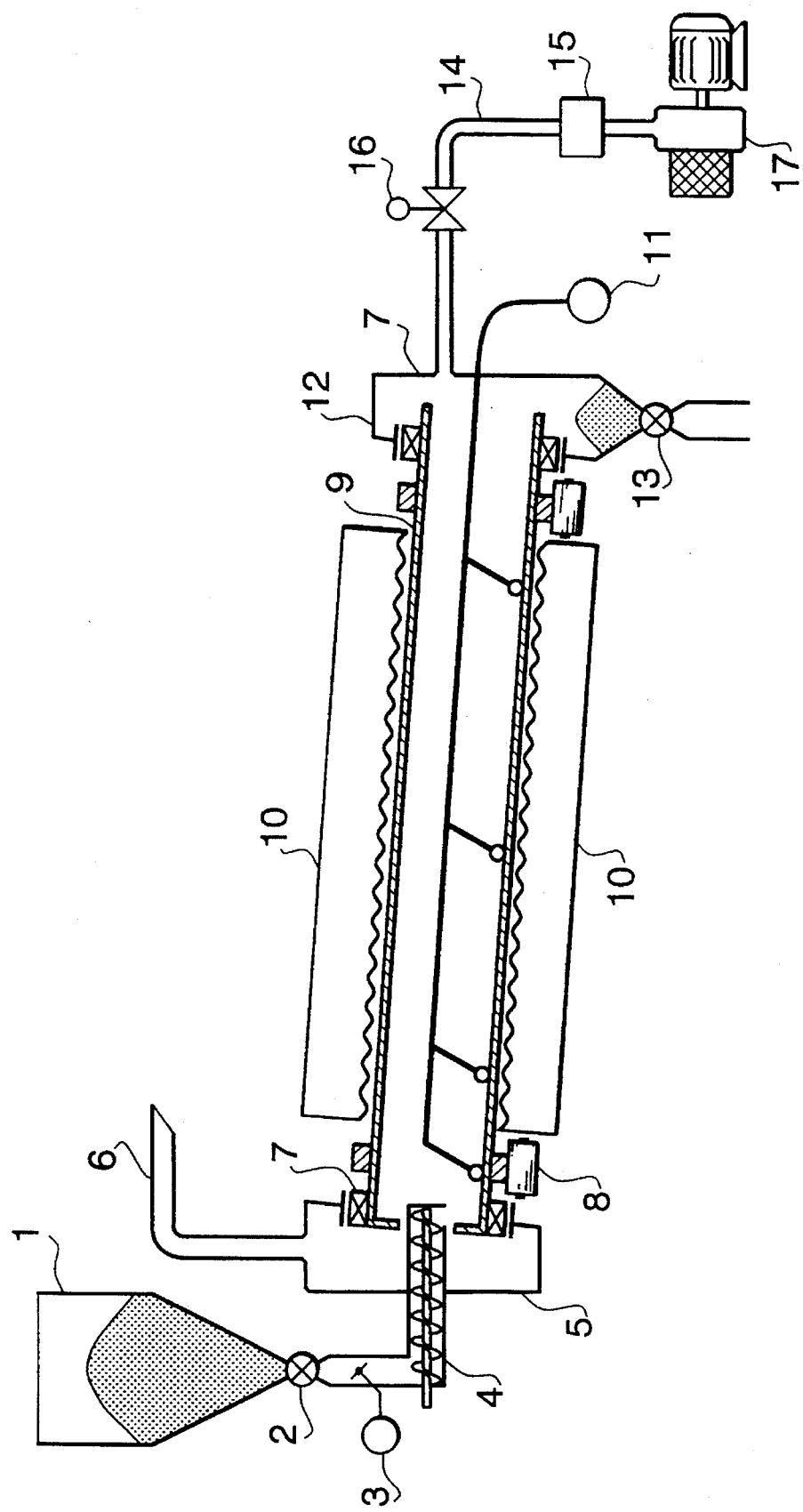
FIG. 1 is a longitudinally sectional view showing the construction of a continuous rotary furnace with external heating which is used to calcined water-containing manganese dioxide embodying the present invention.

FIG. 1 shows a continuous rotary furnace with external heating used in the method of the present invention.

In FIG. 1, the continuous rotary furnace with external heating comprises a hopper 1 for water-containing manganese dioxide, a supply device 2, a supply weight continuous measuring meter 3, a supply conveyor 4, a supply side hood 5, an air discharge duct. 6, an air seal packing 7, a calcination kiln driving roller 8, a calcination kiln 9, a heater 10, a temperature sensor 11, a discharge side hood 12, a discharge device 13, an air supply duct 14, an air flow meter 15, an air amount adjuster 16, and an air blower 17.

In this process, the calcination of water-containing manganese dioxide is ,carried out using a continuous rotary furnace with external heating as shown in FIG. 1. The calcination kiln 9 is formed of stainless steel to have a sufficient heat resistance, and is heated by the heater 10 from the outside thereof. In the calcination kiln 9 are disposed a plurality of temperature sensors 11 along the longitudinal direction of the calcination kiln 9 so that the sensors come into direct contact with water-containing manganese dioxide which is continuously moved in the calcination kiln 9, whereby the actual temperature of the water-containing manganese dioxide (hereinafter referred to as "material temperature") can be continuously measured. The material temperature can be adjusted to a desired temperature by controlling the temperature of the heater 10.

In order to set the air ratio to a fixed value, air which is introduced into the calcination kiln 9 is required to be wholly discharged from the air discharge duct 6 with no leakage. In this process, this requirement is satisfied, not only by providing a so-called material seal in the hopper 1 for the water-containing manganese dioxide and the discharge side hood 12, but also by mounting the air seal packing 7 on the slide surface between the calcination kiln 9 and the supply side hood 5 and on the slide surface between the calcination kiln 9 and the discharge side hood 12.

The supply of the fixed amount of water-containing manganese dioxide can be performed by automatically controlling the supply device 2 using the supply weight continuous measuring meter 3. Likewise, the fixed amount supply of air can be performed by automatically controlling the air amount adjuster 16 using the air flow amount meter 15.

EXAMPLE 1

The continuous rotary furnace with external heating having the construction as described above was used, and water-containing manganese dioxide was calcined while varying the calcination temperature and the air ration. The characteristics of calcined manganese dioxide thus formed is shown in Tables 1, 2 and 3.

TABLE 1

| | (Occurrence of $Mn_2O_3$) | | | | | |
|---|---|---|---|---|---|---|
| CAL-CINATION | AIR RATIO | | | | | |
| TEM-PERATURE | 5 Nl/kg | 20 Nl/kg | 100 Nl/kg | 500 Nl/kg | 1000 Nl/kg | 2000 Nl/kg |
| 430° C. | O | O | O | O | O | O |
| 440° C. | O | O | O | O | O | O |
| 450° C. | O | O | O | O | O | O |
| 460° C. | Δ | Δ | O | O | O | O |
| 470° C. | Δ | Δ | O | O | O | O |
| 480° C. | X | Δ | Δ | O | O | O |
| 490° C. | X | X | X | X | Δ | Δ |

"O": no peak was detected for $Mn_2O_3$;
"Δ": weak peak was detected for $Mn_2O_3$;
"X": strong peak was detected for $Mn_2O_3$.

TABLE 2

| | (SPECIFIC SURFACE AREA ($m^2/g$)) | | | | | |
|---|---|---|---|---|---|---|
| CAL-CINATION | AIR RATIO | | | | | |
| TEM-PERATURE | 5 Nl/kg | 20 Nl/kg | 100 Nl/kg | 500 Nl/kg | 1000 Nl/kg | 2000 Nl/kg |
| 430° C. | 27 | 34 | 36 | 40 | 40 | 41 |
| 440° C. | 26 | 30 | 35 | 36 | 38 | 39 |
| 450° C. | 26 | 29 | 34 | 35 | 36 | 36 |
| 460° C. | 24 | 27 | 32 | 33 | 33 | 35 |
| 470° C. | 23 | 27 | 29 | 32 | 32 | 32 |
| 480° C. | 22 | 25 | 26 | 28 | 30 | 29 |
| 490° C. | 21 | 23 | 24 | 24 | 26 | 26 |

TABLE 3

| | (CONTENT OF BOUND WATER (%)) | | | | | |
|---|---|---|---|---|---|---|
| CAL-CINATION | AIR RATIO | | | | | |
| TEM-PERATURE | 5 Nl/kg | 20 Nl/kg | 100 Nl/kg | 500 Nl/kg | 1000 Nl/kg | 2000 Nl/kg |
| 430° C. | 0.64 | 0.50 | 0.40 | 0.34 | 0.32 | 0.33 |
| 440° C. | 0.56 | 0.44 | 0.34 | 0.31 | 0.30 | 0.30 |
| 450° C. | 0.54 | 0.42 | 0.30 | 0.26 | 0.26 | 0.27 |
| 460° C. | 0.48 | 0.40 | 0.30 | 0.26 | 0.24 | 0.25 |
| 470° C. | 0.45 | 0.35 | 0.26 | 0.22 | 0.22 | 0.20 |
| 480° C. | 0.38 | 0.30 | 0.21 | 0.17 | 0.17 | 0.18 |
| 490° C. | 0.30 | 0.21 | 0.16 | 0.12 | 0.13 | 0.14 |

The used water-containing manganese dioxide was electrolytic manganese dioxide having phosphorus which was produced by a method as disclosed in JPA Hei 267693 and JPA Hei 2155166. This electrolytic manganese dioxide has a phosphorus content of 0.28 wt % and a specific surface area of 62 $m^2/g$. The specific surface area was measured by an $N_2$ gas absorption method, and a deaeration condition was set to 250° C. and 20 minutes. The electrolytic manganese dioxide was continuously supplied at a fixed amount of 100 kg per hour into the calcination furnace.

By adjusting the rotational speed and inclination angle of the calcination kiln, a residence time for the electrolytic manganese dioxide was adjusted to 2 hours in Example 1. However, the electrolytic manganese dioxide in the furnace is strongly stirred and mixed with air, so that no problem occurs if the residence time is further shortened, insofar as the material temperature reaches the calcination temperature.

Table 1 shows the presence or absence of a peak of $Mn_2O_3$ (dimanganese trioxide) which occurs at about 33° in a measured Cu-tube X-ray diffraction diagram of the calcined manganese dioxide. In Table 1, "○" represents no detection of the peak of $Mn_2O_3$, and thus the obtained calcined manganese dioxide was proved to be the β-type manganese dioxide. On the other hand, "Δ" represents that the peak of $Mn_2O_3$ was slightly detected (i.e., the detection of a weak peak of $Mn_2O_3$), and "×" represents that the peak of $Mn_2O_3$ was strongly detected (i.e., the detection of a strong peak of $Mn_2O_3$) and thus the thermal decomposition of the manganese dioxide to $Mn_2O_3$ was promoted at the calcination time.

As is apparent from Table 1, even in the case where the calcination temperature was increased to 440° to 480° C., the thermal decomposition of manganese dioxide could be suppressed when the air ratio was increased to 20 Nl/kg or more. The thermal decomposition could be perfectly suppressed in the calcination temperature range of 450° to 470° C. and in the air ration range of 100 to 1000 Nl/kg.

However, when the calcination temperature was increased to 490° C. or more, it was difficult to perfectly suppress the thermal decomposition even if the air ratio is increased to 1000 Nl/kg. If the air ratio is increased to more than 2000 Nl/kg, dispersion of manganese dioxide would occur frequently and this is not realistic. Therefore, Example 1 eliminates the experiment under this condition. On the other hand, if the air ratio is decreased to less than 20 Nl/kg, the thermal decomposition is promoted even at 480° C.

Table 2 shows the specific surface area of the calcined manganese dioxide obtained under the above condition. The measurement of the specific surface area was carried out at the same condition as the measurement of the electrolytic manganese dioxide.

As is apparent from Table 2, as the calcination temperature increased, the specific surface area of the calcined manganese dioxide was more reduced as compared with that of the electrolytic manganese dioxide before calcined. However, the larger the air ratio was, the smaller the reduction rate of the specific surface area was, so that the calcined manganese dioxide having a large specific surface area could be obtained. The effect could not be more improved even if the air ratio is increased to 1000 Nl/kg or more.

Table 3 shows the content of bound water in the calcined manganese dioxide obtained under the condition. With respect to calcined manganese dioxide used for the lithium primary battery, water which is eliminated from manganese dioxide at 100° C. or less, was removed in a heating process on a battery manufacturing line, and thus it is practically no problem. Therefore, in Example 1, the bound water which is discharged when the calcined manganese dioxide is heated in the range of 100° C. to 500° C. was measured by a Karl Fischer's method.

As is apparent from Table 3, the content of the bound water was reduced as the calcination temperature increased. In addition, as the air ratio was increased, the content of the bound water was reduced. The reason for this is considered as follows. That is, increase of the air ratio reduces the moisture partial pressure in the furnace, so that elimination of the bound water from the calcined manganese dioxide in an equilibrium state is accelerated. However, the reduction effect of the bound water content is hardly varied even if the air ratio is increased to 1000 Nl/kg or more.

Figure 2:
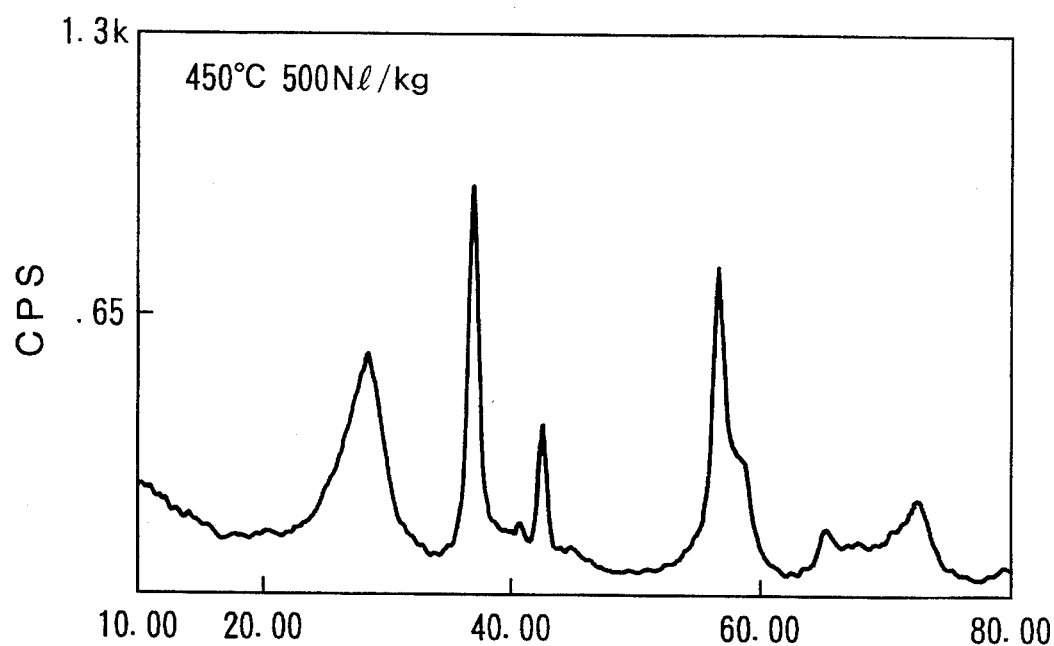
FIG. 2 is a chart for an X-ray diffraction diagram of calcined manganese dioxide at 450° C. and 500 Nl/kg in Example 1.
Figure 3:
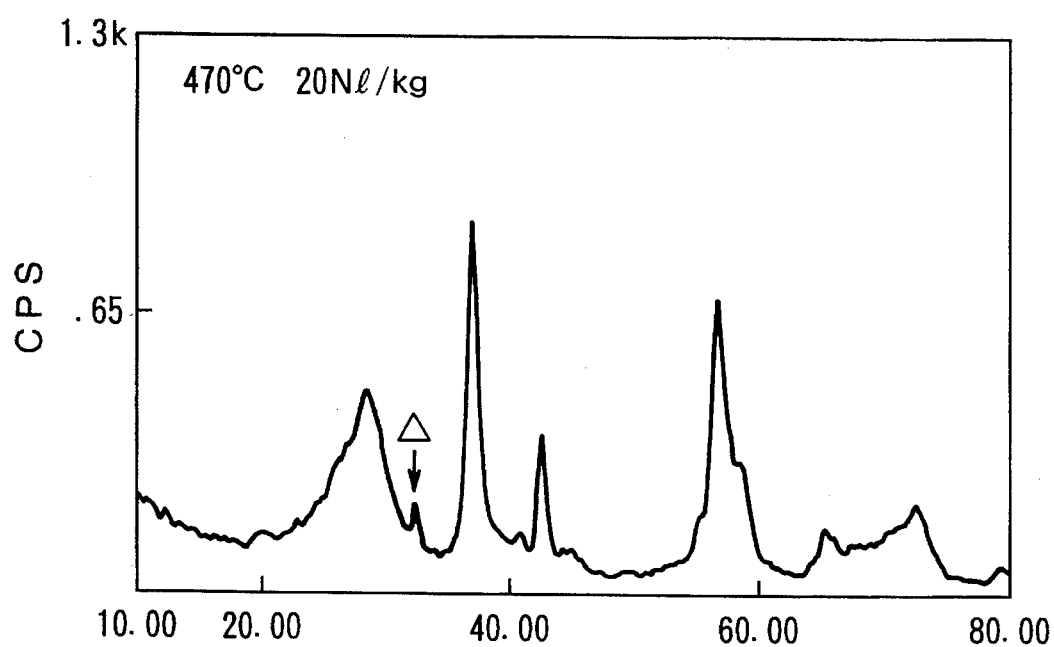
FIG. 3 is a chart for an X-ray diffraction diagram of calcined manganese dioxide at 470° C. and 20 Nl/kg in Example 1.
Figure 4:
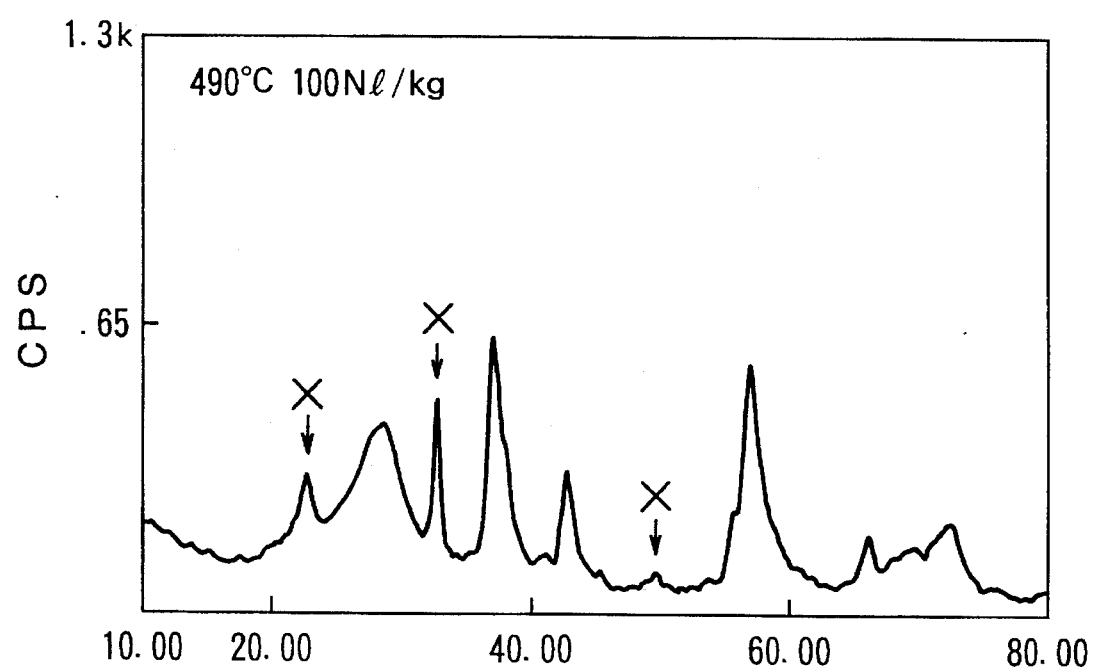
FIG. 4 is a chart for an X-ray diffraction diagram of calcined manganese dioxide at 490° C. and 100 Nl/kg.

FIGS. 2, 3 and 4 show X-ray diffraction diagrams of manganese dioxide which was obtained under various conditions of the calcination temperature and the air ratio. FIG. 2 shows an X-ray diffraction diagram of calcined manganese dioxide which was obtained at 450° C. and 500 Nl/kg (in the range of this invention). In FIG. 2, no peak of $Mn_2O_3$ is observed. However, under the condition of 470° C. and 20 Nl/kg, a slight (weak) peak is observed at the position indicated by "Δ" as shown in FIG. 3. However, a remarkable (strong) peak is observed at three positions as indicated by "×" in FIG. 4 which shows an X-ray diffraction diagram of calcined manganese dioxide which was observed under the condition of 490° C. and 100 Nl/kg (out of the range of this invention).

COMPARATIVE EXAMPLE 1

A thermal decomposition status of calcined manganese dioxide was measured while varying only $O_2$ concentration in introduced air using the same facilities, the same electrolytic manganese dioxide and the same supply amount and residence time as Example 1. The measurement result is shown in FIG. 4.

The symbols (○, Δ, ×) in Table 4 represents the same status as Table 1. The air ratio was set to 20 Nl/kg at which the thermal decomposition was relatively liable to occur. The adjustment of the $O_2$ concentration in the introduced air was performed by adding $N_2$ gas or $O_2$ gas to the air.

TABLE 4

| | (Occurrence of $Mn_2O_3$) | | |
|---|---|---|---|
| CALCINATION | $O_2$ concentration | | |
| TEMPERATURE | 10% | 21% (air) | 30% |
| 440° C. | ○ | ○ | ○ |
| 460° C. | Δ | Δ | Δ |
| 480° C. | × | Δ | Δ |

As is apparent from Table 4, when the $O_2$ content was reduced to 10%, the thermal decomposition occurred at a high temperature of 480° C. and a peak of $Mn_2O_3$ was observed. On the other hand, when the $O_2$ concentration was increased to 30%, no significant difference was observed as compared with a sample using a normal air which was not adjusted in component. Furthermore, no significant difference was observed with respect to the water content and the specific surface area.

COMPARATIVE EXAMPLE 2

Electrolytic manganese dioxide was calcined using the facilities and the method which were generally used in the prior art, and the result is shown in Table 5.

TABLE 5

(TEST RESULT OF BATCH TYPE STANDING Calcination FURNACE)

| CALCINATION TEMPERATURE | THERMALLY DEFORMED $Mn_2O_3$ | SPECIFIC SURFACE AREA $m^2/g$ | BOUND WATER % |
| --- | --- | --- | --- |
| 430° C. | O | 25 | 0.64 |
| 440° C. | O | 23 | 0.51 |
| 450° C. | Δ | 22 | 0.44 |
| 460° C. | X | 20 | 0.33 |
| 470° C. | X | 20 | 0.31 |
| 480° C. | X | 18 | 0.28 |

The used calcination furnace was a batch type standing calcination furnace, and the same type electrolytic manganese dioxide (having a layer thickness of 5 cm) as used in this example was placed on a square table of stainless steel which was inherently provided to the furnace.

The calcination needed about four hours for temperature increase because of the batch type, then the set temperature was kept for four hours, and then the sample was taken out from the furnace. The same measurement method as Example 1 was used.

As is apparent from Table 5, in this comparative example, the calcination temperature is limited to 440° C. at maximum, and if the calcination temperature increases to more than 440° C., the thermal decomposition of manganese dioxide starts. Furthermore, the reduction rate of the specific surface area is large, and the amount of the residual bound water is larger than in Example 1.

In Example 1, the electrolytic manganese dioxide having phosphorus was used as the water-containing manganese dioxide, however, this invention may be applied to the calcination of normal electrolytic manganese dioxide, chemical manganese dioxide and natural manganese dioxide.

With respect to calcined manganese dioxide for a coin-type lithium primary battery, an extremely long term preservation is particularly required although a low temperature heavy load characteristic is not so strongly required therefor. In this case, the calcination of electrolytic manganese dioxide used for a manganese battery or alkali manganese battery is suitably used, and if the method of this invention is applied, calcined manganese dioxide having lower bound water content than that of the prior art can be provided. Accordingly, the long term preservation of the coin-type lithium primary battery.

Recently, a cylinder type lithium primary battery has been required to be improved in heavy load discharge performance in a low temperature range, and thus the following characteristics are required for calcined manganese dioxide.

(1) Occurrence of $Mn_2O_3$: very fine, preferably no detection.
(2) Specific surface area: above 25 $m^2/g$, preferably 28 to 36 $m^2/g$.
(3) Content of bound water: below 0.45%, preferably below 0.30%.

It is apparent that the calcined manganese dioxide having the preferable characteristics as described above cannot be obtained in the comparative example 2 using the conventional method at the calcination temperature of 440° C. or more.

The reason for this may be considered as follows. Since the temperature increasing time is long and the furnace is of standing type, gas located in the water-containing manganese dioxide layer rarely moves, so that the water-containing manganese dioxide at portions other than the surface portion is exposed to a high moisture partial pressure and a relatively low oxygen partial pressure during the calcination.

On the other hand, in Example 1, there is the calcination condition under which the indispensable three items (1) to (3) as described above are satisfied at the same time. That is, the calcination temperature is from 440° C. to 480° C. and the air ratio is from 20 to 2000 Nl/kg. In order to obtain calcined manganese dioxide having more preferable characteristics, the following calcination is more preferable: the calcination temperature range of 450° C. to 470° C. and the air ratio range of 100° to 1000 Nl/kg.

No problem occurs if the air ratio is increased to more than 2000 Nl/kg, however, it has no industrial merit because of dispersion loss of manganese dioxide and increase of thermal loss during the calcination process.

What is claimed is:

1. A method of producing manganese dioxide for a lithium primary battery including a heat treatment of hydrated manganese dioxide for dehydration, characterized in that said heat treatment comprises continuously calcining hydrated manganese dioxide in an external heating rotary type continuous calcining furnace at a calcination temperature ranging from 440° C. to 480° C., and that a flow rate of air introduced into the furnace is adjusted to a value in a range of 20 to 2000 Nl per kilogram hydrated manganese dioxide which is supplied into the furnace.

2. The method claimed in claim 1, wherein the calcination temperature is from 450° to 470° C.

3. The method claimed in claim 1, wherein the flow rate of air introduced into the furnace is adjusted to the value of from 100 to 1000 Nl per 1 kg water-containing manganese dioxide which is supplied into the furnace.

4. The method claimed in claim 1, wherein the water-containing manganese dioxide contains phosphorus in an amount of from 0.05 to 2.0 wt %.

5. The manganese dioxide produced by the method claimed in claim 1.

* * * * *

UNITED STATES PATENT AND TRADEMARK OFFICE
CERTIFICATE OF CORRECTION

PATENT NO. : 5,523,073
DATED : June 4, 1996
INVENTOR(S) : Hiroshi Sumida; Yoshio Nakatani; Takuya Deguchi It is certified that error appears in the above-indentified patent and that said Letters Patent is hereby corrected as shown below:

```
Column 1, line 10, change "anode" to --cathode--;
Column 1, line 14, change "anode" to --cathode--;
Column 1, line 16, change "anode" to --cathode--;
Column 1, line 20, change "anode" to --cathode--;
Column 1, line 25, change "anode" to --cathode--;
Column 1, line 26, change "anode" to --cathode--;
Column 1, line 50, change "anode" to --cathode--;
Column 1, line 52, change "a cathode" to --an anode--; and
Column 8, line 20, change "observed" to --obtained--.
```

Signed and Sealed this

Fifteenth Day of April, 1997

Attest:

BRUCE LEHMAN

Attesting Officer

Commissioner of Patents and Trademarks